UNITED STATES PATENT OFFICE.

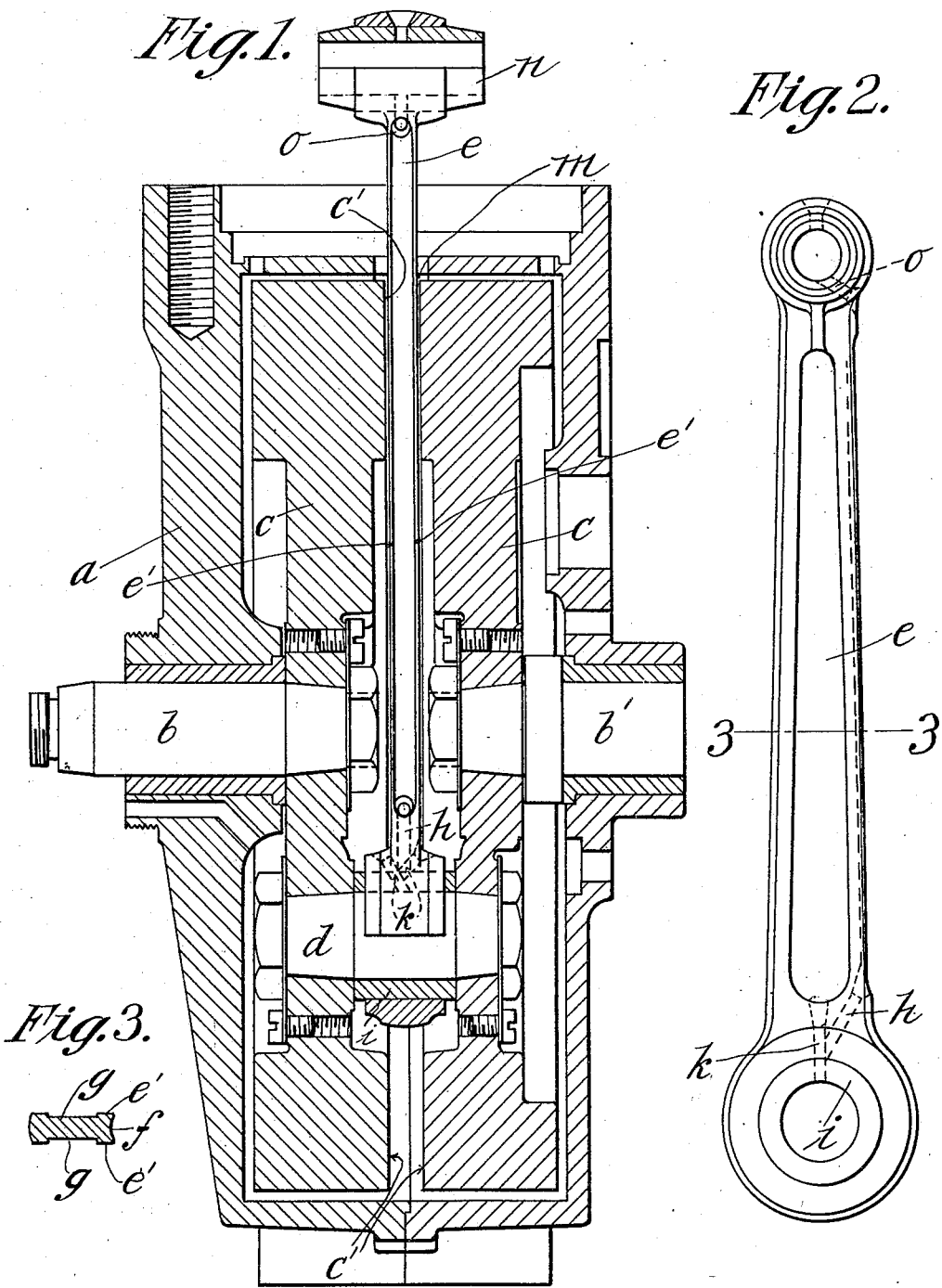

CARL O. HEDSTROM, OF SPRINGFIELD, MASSACHUSETTS.

SELF-OILING CONNECTING-ROD.

No. 895,755.  Specification of Letters Patent.  Patented Aug. 11, 1908.

Application filed December 21, 1907. Serial No. 407,484.

*To all whom it may concern:*

Be it known that I, CARL OSCAR HEDSTROM, a citizen of the United States of America, residing at Springfield, in the county of Hampden and State of Massachusetts, have invented new and useful Improvements in Self-Oiling Connecting-Rods, of which the following is a specification.

This invention relates to improvements in oiling devices for connecting-rods and is primarily designed to be used in connection with internal combustion engines, wherein the fly-wheel which revolves in oil in the crank casing will throw small quantities of the same during its rotary movements, into longitudinally disposed channels in the connecting-rod, and by dripping or running back down the channels will thoroughly oil the crank-shaft bearings by means of suitable oil holes provided in the rod and communicating with the channels, whereby the oil will thoroughly lubricate the bearing boxes of the crank-shaft, as will be fully described in the body of the specification.

In the drawings forming part of this application,—Figure 1 is a vertical sectional view taken through the main shaft of an internal combustion engine and showing the casing and fly-wheels in section, and the connecting-rod in edge elevation. Fig. 2 is a detail side view of the connecting-rod showing the position of the oil passages for conveying the oil to the bearings at the opposite ends thereof. Fig. 3 is a transverse sectional view of the connecting-rod on the line 3—3 of Fig. 2.

Referring to the drawings in detail, $a$ designates as a whole the casing containing the crank-shaft $b$ and stud $b^1$, and the fly-wheels $c, c$. It will be noticed that the connecting-rod is located between the fly-wheels $c, c$, and is connected to the same by means of the wrist-pin $d$. The forward edge of the connecting-rod $e$ is provided with a groove $f$, (as shown clearly in Fig. 3 in transverse section,) and the side of the rod is also provided with channels or grooves $g, g$. The lower end of the groove or channel $f$ communicates with an oil opening or passage-way $h$ that leads down to the bearing ring or bushing $i$ on the wrist-pin $d$, while the lower end of the groove or channel surfaces $g, g$ communicates with the oil opening or passage-ways $k$.

The faces or side portions $c^1$ of the flywheels $c$, in Fig. 1, it will be seen run very close to the edges $e^1$ of the connecting-rod $e$, as indicated by the reference letter $m$ so that as the rim and face or side portions $c^1$ of the fly-wheels $c, c$ pass through the oil that is located in the bottom of the casing $a$, the oil is thrown therefrom by centrifugal force into the channels $f$ and $g$ and also on account of the small space between the side of the connecting-rod and the face side of the fly-wheels $c$ being in such close proximity to the connecting-rod $e$, the oil is "sheared off" so to speak, by means of the rod, thus completely filling the groove $f$. The oil then drips or runs downward in the channels $f$ and $g$ until it reaches the oil-holes $h$ and $k$ that lead to the bearing-box or bushing $i$ thus thoroughly lubricating the same and the wrist-pin $d$.

It should be stated that the rotation of the fly-wheels $c, c$ is towards the connecting-rod $e$, and thus the oil is thrown from the edge of the wheels directly into the groove $f$. The oil also reaches the grooves or channels $f$ and $g$ by reason of the oil-spray completely filling the casing.

It has been found from experience that on account of the rapid rotary movement of the fly-wheel and connecting-rods of internal combustion engines there is great difficulty in keeping these bearings well lubricated because the oil is thrown therefrom by centrifugal force. This is also true of the bearing at the other or opposite end of the connecting-rod $e$, as designated at $m$. Therefore, in order to thoroughly lubricate the ends of the connecting-rod, I provide the oil openings described above and also provide an oil opening $o$ that communicates with the edge portion of the rod, as shown in Fig. 2.

From this construction, it is clear that on account of the connecting-rod having the oil thrown thereon by means of the fly-wheels $c$ and being permitted to run down the channels or grooves $f$ and $g$ and through the oil openings $h$ and $k$ to the bushing or bearing $i$ the latter will be thoroughly lubricated and also the oil will be permitted to flow through the opening $o$ to the bearing $n$ of the connection rod.

What I claim, is:—

1. In combination, a crank-shaft, a flywheel thereon, a connecting-rod, the rod being provided with longitudinally disposed channels or grooves leading into openings which terminate in the bearing portion of the rod, whereby when oil is thrown by centrifugal force from the edge of the fly-wheel into the channels or grooves of the rod the crank-shaft bearings will be lubricated.

2. An oiling device for crank-shafts for internal combustion engines, in combination with said shafts, a casing, a connecting-rod provided with channels or grooves in the side and edge portions of the rod, the connecting-rod having openings communicating with the grooves and leading to the crank-shaft bearing, fly-wheels located in close proximity to the opposite sides of the rod and running in oil contained in the crank casing whereby the oil is thrown by centrifugal force into said grooves, as described.

CARL O. HEDSTROM.

Witnesses:
K. I. CLEMONS,
H. W. BOWEN.